Patented Jan. 16, 1951

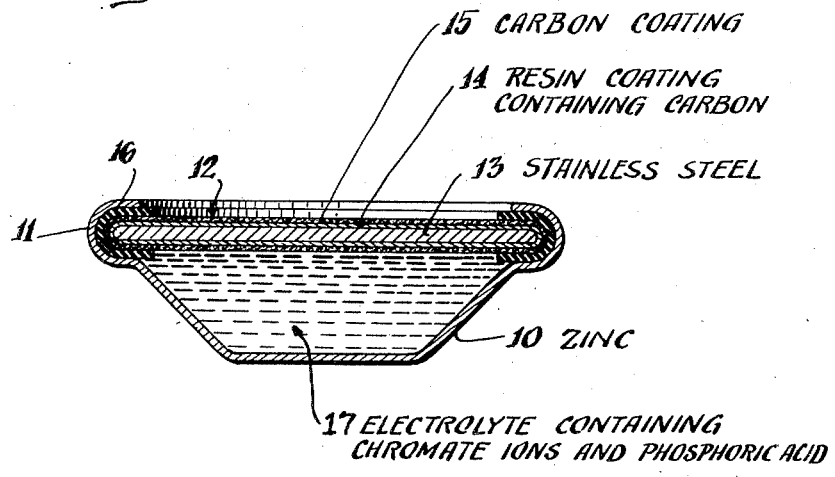
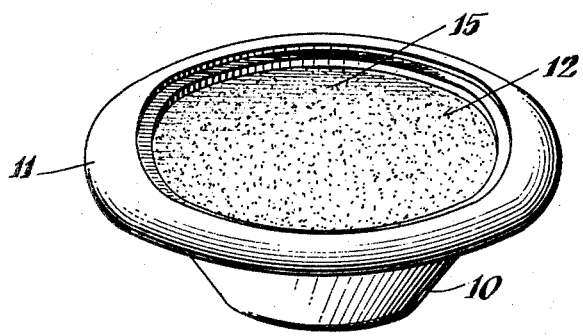

2,538,079

UNITED STATES PATENT OFFICE 2,538,079

POTENTIAL PRODUCING CELL

James M. Booe, Indianapolis, Ind., assignor to P. R. Mallory & Co., Inc., Indianapolis, Ind., a corporation of Delaware Application June 19, 1948, Serial No. 34,085

5 Claims. (Cl. 136—102)

This invention relates to potential producing cells and to a novel electrolyte therefor.

Potential producing cells are utilized to produce a potential difference between different portions of a circuit without supplying power thereto. A common use of such a cell is in electron tube grid circuits where it is desired to bias the grid, that is to establish a potential difference between the grid and cathode, without the flow of appreciable grid current. Prior cells of this type have been somewhat difficult to manufacture and their efficiency ordinarily drops off at low temperatures. Furthermore, such prior art cells normally produce a rather low voltage and the voltage falls off rapidly as the cell ages.

I have found that the difficulties encountered with the prior art cells can be overcome or greatly minimized by using the principles of the present invention. My potential producing cells may be readily manufactured, and they produce a relatively high voltage which remains constant over extended periods of time. The life of such cells, when used to supply a fixed potential to a circuit without drawing current therefrom is practically unlimited due to the hygroscopic nature of my novel electrolyte. In fact, the water content of the electrolyte is maintained for extended periods of time even at temperatures as high as 60° C. These results are attributable to the use of phosphoric acid in the electrolyte, this hygroscopic compound absorbing sufficient water from the atmosphere to maintain the liquid or pastelike electrolyte in a moist condition. Further, the phosphoric acid controls the pH of the electrolyte and cooperates with the other ingredient of the electrolyte to inhibit corrosion of the anode, the cell thereby producing the proper potential without supplying appreciable current to the circuit with which it is used. The other essential ingredient of the electrolyte is a sufficient concentration of chromate ions to act as a depolarizer, this constituent preferably being present in the form of sodium dichromate.

It is an object of the invention to improve the construction and operation of potential producing cells.

It is a further object of the invention to produce a cell having an extremely long life and embodying a hygroscopic, viscous electrolyte.

It is a still further object of the invention to provide a potential producing cell having an electrolyte composed of a mixture of anhydrous sodium dichromate and phosphoric acid.

The invention likewise contemplates a cell having an output voltage higher than heretofore obtained, generally in the neighborhood of 1.7 volts.

Various other advantages, objects and features of the invention will become apparent from the following detailed description taken in conjunction with the accompanying drawing in which:

Figure 1 is a vertical sectional view showing the cell constructed in accordance with the invention; and Figure 2 is a perspective view of the cell shown in Figure 1.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawing in detail, the potential producing cell comprises a zinc or cadmium cup 10 having a flanged portion 11 at the open end thereof, this cup serving as the anode of the cell. A cathode assembly 12 is positioned in the open end of the cup and this assembly comprises a metal base 13, such as stainless steel, to which is applied a resinous carbon-containing coating 14 and a second coating 15 of colloidal graphite. A packing ring 16 of resilient insulating material holds the cathode assembly in position within the cup.

Within the cup is my novel electrolyte 17 in the form of a viscous hygroscopic liquid or of a stiff hygroscopic paste, this electrolyte comprising sodium dichromate, phosphoric acid and water. The relative proportions of the constituents of the electrolyte may be varied within broad ranges and satisfactory electrolytes may be obtained having the composition appearing from the following table in which the quantity of the several constituents is represented in percentages by weight:

A

|  | Per cent |
|---|---|
| Sodium dichromate ($Na_2Cr_2O_7$) | 45–70 |
| Phosphoric acid (100% $H_3PO_4$) | 10–35 |
| Water | 5–45 |

The preferred range of the constituents of the electrolyte is as follows:

B

|  | Per cent |
|---|---|
| Sodium dichromate ($Na_2Cr_2O_7$) | 50–70 |
| Phosphoric acid (100% $H_3PO_4$) | 15–20 |
| Water | 25–30 |

In a practical and commercial form of the invention, excellent results have been obtained with an electrolyte having approximately the following composition:

C

| Sodium dichromate ($Na_2Cr_2O_7$) | 53.2 |
|---|---|
| Phosphoric acid (100% $H_3PO_4$) | 18.1 |
| Water | 28.7 |

It will be noted that in the foregoing tables the sodium dichromate and the phosphoric acid contents are based on the anhydrous form of these constituents, since this procedure greatly simplifies the expression of the water content. However, when preparing the electrolyte on a practical and industrial scale, it is preferred to use the phosphoric acid as an 85% solution and the sodium dichromate in the hydrated condition containing two molecules of water.

While all of the electrolyte covered by the broad ranges A are capable of satisfactory operation in a potential producing cell of the described character, it has been found that when any one of the constituents (sodium dichromate, phosphoric acid and water) is adjusted close to one of the extreme (lowest or highest) values of its range, it is desirable to hold the other two constituents in the same ratio as they are present in the specific example given under C ($Na_2Cr_2O_7$ 53.2%, $H_3PO_4$ 18.1%, $H_2O$ 28.7%). For example, if the water content is increased to about 45%, the ratio of phosphoric acid to sodium dichromate should be maintained at approximately 18.1 to 53.2.

The consistency of the electrolyte compositions within the broad range may vary from a hygroscopic liquid to a hygroscopic paste; the latter being produced when an excess amount of sodium dichromate is used. Generally, any percentage of sodium dichromate above 53.2% would not dissolve and this excess, if in a finely ground condition, would immobilize the electrolyte to make it of a paste-like consistency.

The broad pH range of the electrolytes embodying the invention is from zero to three, the preferred pH range being from zero to one. Of course, the pH of a specific electrolyte is determined by the composition of the electrolyte and the pH may be adjusted to any desired value by appropriate adjustment of the electrolyte composition. The voltage of the cell varies inversely with the pH. For example, a cell having an electrolyte with a pH of about 3 has a voltage between 1.5 and 1.6. A cell including an electrolyte having the specific composition listed under C and a pH of 0 to 1, has a voltage of 1.7 to 1.8 volts.

The interrelation between the pH of the electrolyte and the voltage of the cell made with such electrolyte will further appear from the following table:

| pH | Voltage |
|---|---|
| 0 | 1.8 |
| 1 | 1.7 |
| 2 | 1.6 |
| 3 | 1.5 |

It will be noted that the principles of the present invention provide various important advantages. Thus, one of the important novel features of the invention is the use of an electrolyte having a pH as low as zero and being at the same time sufficiently non-reactive with an anode of zinc or cadmium as to permit the construction of satisfactorily sealed cells capable of operation over a long period of time even at temperatures as high as 60° C. Also potential producing cells of the invention will operate satisfactorily at temperatures as low as −50° C. Another important advantage of the invention is due to the hygroscopic character of the electrolyte which tends to maintain its water content and consequently permits continuous operation of the cell at temperatures of 60° C., or higher. Experiments have demonstrated that cells embodying the invention may be operated for well over 4000 hours at 60° C. without any appreciable loss of water or drop in voltage.

Although the present invention has been disclosed in connection with a few preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

What is claimed is:

1. A potential producing cell comprising an anode selected from the group consisting of zinc and cadmium, a cathode, and a hygroscopic, viscous electrolyte in contact with said anode and said cathode; said electrolyte consisting of 10 to 35% by weight of phosphoric acid, 45 to 70% by weight of sodium dichromate, and 5 to 45% by weight of water.

2. A potential producing cell comprising an anode selected from the group consisting of zinc and cadmium, a carbon cathode, and a hygroscopic, viscous electrolyte in contact with said anode and said cathode, said electrolyte consisting of 10 to 35% by weight of phosphoric acid, 45 to 70% by weight of sodium dichromate, and 5 to 45% by weight of water, the pH of said electrolyte being between 0 and 3.

3. A potential producing cell comprising an anode selected from the group consisting of zinc and cadmium, a carbon cathode, and a hygroscopic, viscous electrolyte in contact with said anode and said cathode, said electrolyte consisting of 15 to 20% by weight of phosphoric acid, 50 to 70% by weight of sodium dichromate, and 25 to 30% by weight of water.

4. A potential producing cell comprising an anode selected from the group consisting of zinc and cadmium, a carbon cathode, and a hygroscopic electrolyte in contact with said anode and said cathode, said electrolyte consisting of about 18.1% by weight of phosphoric acid, about 53.2% by weight of sodium dichromate, and about 28.7% by weight of water.

5. A potential producing cell comprising an anode selected from the group consisting of zinc and cadmium, a carbon cathode, and a hygroscopic electrolyte in contact with said anode and said cathode, said electrolyte consisting of 10 to 35% by weight of phosphoric acid, 45 to 70% by weight of sodium dichromate, and 5 to 45% by weight of water, the preferred amount of the said three constituents respectively being 18.1%, 53.2% and 28.7% by weight, wherein upon adjustment of any of the said three constituents toward one of the extreme values of its range the ratio of the remaining two constituents is so adjusted as to equal the ratio of such constituents present in the preferred percentages.

JAMES M. BOOE.

REFERENCES CITED

The following references are of record in the file of this patent:

UNITED STATES PATENTS

| Number | Name | Date |
|---|---|---|
| 1,839,498 | Porth | Jan. 5, 1932 |
| 2,116,091 | Williams | May 3, 1938 |

FOREIGN PATENTS

| Number | Country | Date |
|---|---|---|
| 320 | Great Britain | of 1889 |
| 12,724 | Great Britain | of 1885 |

OTHER REFERENCES

Barbian et al., Transactions of The Electrochemical Society, vol. 91 (1947), pages 387–404.

Transactions of the American Electrochemical Society, vol. 53 (1928), pages 45–69, particularly page 45.